(12) United States Patent  
Muir

(10) Patent No.: US 8,797,335 B2  
(45) Date of Patent: *Aug. 5, 2014

(54) PLATFORM AGNOSTIC SCREEN CAPTURE TOOL

(75) Inventor: David James Malcolm Muir, Markham (CA)

(73) Assignee: International Business Machines Corporation, Armonk, NY (US)

( * ) Notice: Subject to any disclaimer, the term of this patent is extended or adjusted under 35 U.S.C. 154(b) by 938 days.

This patent is subject to a terminal disclaimer.

(21) Appl. No.: 12/479,038

(22) Filed: Jun. 5, 2009

(65) Prior Publication Data

US 2010/0309212 A1 Dec. 9, 2010

(51) Int. Cl.
*G06T 1/00* (2006.01)
*G06T 15/00* (2011.01)

(52) U.S. Cl.
USPC .......................................................... 345/522

(58) Field of Classification Search
USPC .......................................................... 345/522
See application file for complete search history.

(56) References Cited

U.S. PATENT DOCUMENTS

| | | | |
|---|---|---|---|
| 2003/0115552 A1 | 6/2003 | Jahnke et al. | |
| 2004/0064500 A1* | 4/2004 | Kolar et al. | 709/202 |
| 2007/0208840 A1 | 9/2007 | McConville et al. | |
| 2008/0062203 A1* | 3/2008 | Williams | 345/666 |
| 2012/0154433 A1 | 6/2012 | Muir | |

FOREIGN PATENT DOCUMENTS

| | | |
|---|---|---|
| CN | 1588302 A | 3/2005 |
| JP | 2001243089 A | 9/2001 |
| JP | 2003108498 A | 4/2003 |
| JP | 2006229597 A | 8/2006 |
| WO | 2007098701 A1 | 9/2007 |

OTHER PUBLICATIONS

International Search Report and Written Opinion for PCT Application Serial No. PCT/EP2010/057306 dated Oct. 12, 2010.
Eli M. Dow, "Cross-platform graphics with cairo," Sep. 2007: pp. 1-7, <http://www.ibm.com/developerworks/linux/library/l-cairo/>, retrieved Sep. 29, 2010.
Anonymous, "SVG Screenshots," Aug. 2006, p. 1, <http://www.haiku-os.org/glass_elevator/rfc/svg_screenshots>, retrieved Sep. 29, 2010.
Chinese Office Action for Chinese Application No. 201080009291.0, dated Jul. 5, 2013.
Xiaochun, Zhu et al.; "A Test Automation Solution on GUI Functional Test", Jul. 16, 2008, Industrial Informatics, 2008, INDIN 2008, pp. 1-6.

* cited by examiner

*Primary Examiner* — Xiao Wu
*Assistant Examiner* — Matthew D Salvucci
(74) *Attorney, Agent, or Firm* — Patterson & Sheridan, LLP

(57) ABSTRACT

According to one embodiment of the present invention, a method for platform agnostic screen capture is provided. The method includes acquiring screen data from a computer having a display screen, where the screen data represents an image currently displayed on the display screen. The screen data is converted into a representation capable of being expressed in a plurality of software platforms. The representation of screen data is rendered into a vector graphics file that may be published to a plurality of platforms.

7 Claims, 4 Drawing Sheets

PLATFORM AGNOSTIC SCREEN CAPTURE TOOL

BACKGROUND

The present invention relates to screen capture tools, and more specifically, to a platform agnostic screen capture tool.

Software documentation consists of written text that accompanies computer software and explains how to use the software or how the software operates. End user software documentation may include manuals for the end user, system administrators and support staff. End user software documentation typically describes each feature of the program and may assist the user in realizing these features as well as troubleshooting.

Images of a computer screen are an important component of software documentation. These screen images, also called screen shots or screen captures, may be taken at various stages of the software development process to assist in properly illustrating end user software documentation. These screen captures may be captured using software that actually scrapes the pixels from the screen into a pixel-based graphical file. This graphical file is usually static and targets a specific presentation platform by virtue of its resolution and file format. When a different presentation platform needs to be targeted, the file needs to be either recaptured or processed, for example, by using batch Photoshop conversion.

SUMMARY

According to one embodiment of the present invention, a method comprises: acquiring screen data from a computer having a display screen, the screen data representing an image currently displayed on the display screen; converting the screen data into a representation capable of being expressed in a plurality of software platforms; and rendering the representation of screen data into a vector graphics file, wherein the vector graphics file may be published to a plurality of software platforms.

According to another embodiment of the present invention, a method comprises: modifying a user interface in a software product, the user interface including a screen display; determining if a material change has occurred to the software product, and if so, acquiring screen data representing the user interface as displayed on the display screen; converting the screen data into a representation capable of being expressed in a plurality of software platforms; and rendering the representation of the screen data into a vector graphics file, the vector graphics file having separate layers for widgets.

According to a further embodiment of the present invention, a system comprises: a screen capture tool coupled to a computer system, the screen capture tool receiving screen data relating to a current screen displayed on the computer system; and a vector graphics library component coupled to the screen capture tool, the vector graphics library component generating a representation of the screen data, wherein the screen capture tool uses the representation to generate a vector graphics screen capture file that may be published to a plurality of software platforms.

According to a further embodiment of the present invention, a system comprises: a screen capture tool coupled to a computer system, the screen capture tool receiving screen data relating to a current screen displayed on a software product; a vector graphics rendering library coupled to the screen capture tool, the vector graphics rendering library component generating a representation of the screen data, wherein the screen capture tool uses the representation to generate a vector graphics screen capture file that may be published to a plurality of software platforms; and an end user documentation document containing published versions of a plurality of the vector graphics screen capture files.

According to another embodiment of the present invention, a computer program product for performing screen capture comprises: a computer usable medium having computer usable program code embodied therewith, the computer usable program code comprising: computer usable program code configured to: acquire screen data from a computer having a display screen, the screen data representing an image currently displayed on the display screen; convert the screen data into a representation capable of being expressed in a plurality of software platforms; and render the representation of screen data into a vector graphics file, wherein the vector graphics file may be published to a plurality of software platforms.

DETAILED DESCRIPTION

Embodiments of the invention provide a platform-agnostic screen capture tool. As described above, screen captures are frequently taken during software development for use in end user documentation. One of the technical problems faced by the screen capture process is that the pixel-based graphical file that results, targets a specific presentation platform. As a result, when a different presentation platform needs to be targeted, the file must be either recaptured or further processed using, for example, batch Photoshop conversion.

Another issue encountered in screen captures for end user documentation is the timing of captures in the lifecycle of software development. These captures typically need to be taken toward the end of software development process, so that working (or close to final) software can be used to provide the screen image. In the compressed software development timeframe employed by many development organizations, this makes it difficult to create all the English-language screen captures that are needed to properly illustrate the user documentation. Translating, building, and then manually capturing additional national language versions add even more time to the schedule. To mitigate these problems, the following often occurs: screen captures are taken from the English-only product and are then used to illustrate all languages. In some cases there might be no screen captures at all to ensure parity between the English and other language versions.

Also, there is a process problem that occurs with screen captures for end user documentation during software development. This arises when application programmers make late changes to the user interface. Even when code is under "translation freeze" and the properties files that contain the translated text are not changed, it is possible for developers to change the order and nature of the user interface widgets, leaving any descriptive text unchanged. It is not unprecedented to have the tabbing order or configuration of the widgets look completely different between the actual user interface and the documentation, even when the text has not changed.

To address these and other issues, embodiments of the invention provide a software library and associated run-time executable that sits as an operating system level renderer of screens. These embodiments of the invention output to a vector graphics format with separate layers for widgets including text layers.

Figure 1:
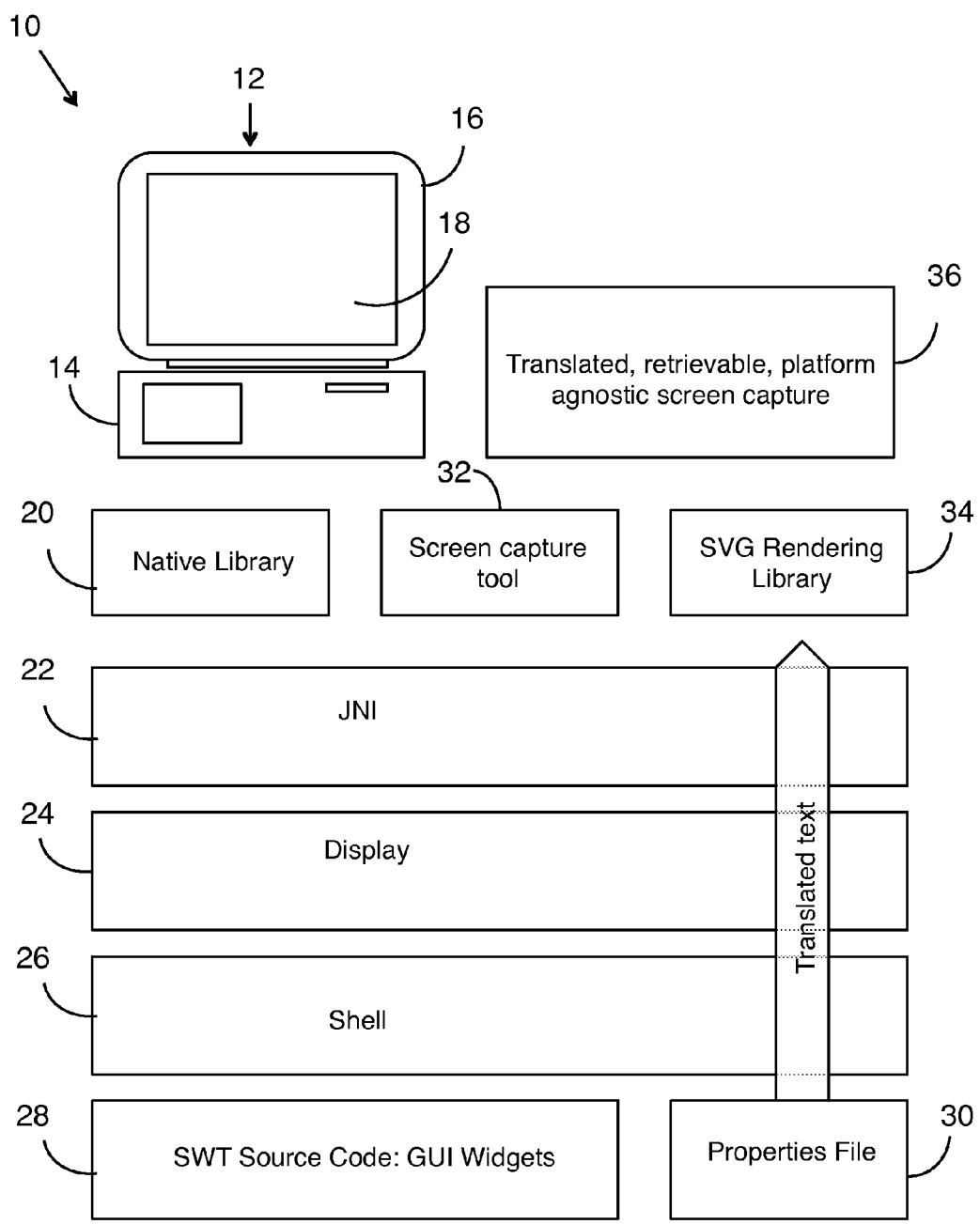
FIG. 1 shows a diagram of the architecture for a screen capture system in accordance with an embodiment of the invention.

FIG. 1 shows the architecture for a screen capture system 10 in accordance with an embodiment of the invention. A computer 12 includes a CPU unit 14 running an operating system (not shown) and a display unit 16, with a display screen 18. The computer 12 may include layers of various standard software components, including a native library 20, a Java Native Interface (JNI) 22, a display component 24, a shell component 26, a standard widget toolkit (SWT) 28, and a properties file 30. In accordance with an embodiment of the invention, a screen capture tool 32 and a scalable vector graphics (SVG) Rendering Library 34 are also included to facilitate the output of a screen capture file 36, which allows the storage of an image of the screen 18 at a given moment.

In conventional screen capture systems, a software developer user may, for example, use the SWT 28 to create a window that will contain some information for a screen of a user interface. The window may be defined as having a particular size in terms of pixels. That window may be rendered on the user's screen by operating system calls which are processed up through the shell 26, display 24, and JNI 22 layers to the native library 20. The operating system calls the native library 20, which may be different for each operating system, whether it is, for example, Linux, Windows, Mac, etc.

In contrast, in the screen capture system 10 of embodiments of the invention, instead of having the operating system talking to the native library 20, the operating system talks to the SVG rendering library 34 in XML to draw the window onto the screen. Thus, all the calls through the shell 26, display 24 and JNI 22 talk to the SVG rendering library 34. The SVG rendering library 34 generates graphics that represent the desired window. These graphics may be a generalized, view of what the window would look like, that is, a representation that is not specifically adapted to any particular operating system. Hence, the SVG rendering library is platform agnostic. Note that in conventional software development processes, while the coding takes place in a manner that is independent of the end platform operating system, a user interface screen can only be rendered into an actual computer screen by a specific operating system. Also, this specific operating system must work in conjunction with a native library 20 that is configured to that operating system. Embodiments of the invention skip this step and render the screen directly into an SVG screen capture file 36. For example, the screen capture file may represent a curve in a desired window on the user interface.

Note that the SVG file is not an exact replica of what the actual window would look like when rendered in an operating system, such as Windows. That is, the SVG representation in the SVG rendering library 34 would show a generalized version of what the window would look like. For example it may show that the window will have a border, a way to expand or collapse, etc. Those skilled in the art will recognize that there may be a variety of ways to represent such windows.

In prior systems, when the code is running in the system 10, it calls certain calls that would normally render particular user interface screens, buttons, etc., on an operating system screen. In contrast, in embodiments of the invention, the SVG rendering library will instead be rendering the SVG files onto the screen. While the system 10 is running, screens may be captured by screen capture tool 32, which comprises an executable layer that sits at the same level as the native library 20. The screen capture tool 32 sequences and modifies those SVG files as the code calls them. In prior conventional systems the native library 20 would be doing this. In the embodiments of the invention, without the use of the native library 20, the screen capture tool 32 needs to be able to follow the code as its running and determine what the screen will look like at any given point. This given point may be after the user takes some action, such as pushes a button. The screen capture tool makes calls to the SVG rendering library 34 that renders the current screen 18 into the screen capture file 36. In general, the screen capture tool 32 does the sequencing while the SVG rendering library 34 determines the look of the window.

The screen capture file 36 may comprise a translated, retrievable, platform agnostic screen capture SVG file. The screen capture file 36, retains a mapping to original widget calls generated by the SWT source code unit 28, and to entries in the properties file 30. This is similar to a debugger's ability to retain links to source lines.

Screens may be captured in two modes. In some embodiment, the screens are captured on-demand by a user or by script-driven interaction with the running system. In other embodiments, a special screen capture mode may be enabled, which is similar to a debugging mode. In this screen capture mode, screen "breakpoints" tell the system when to capture a screen and material changes to the user interface are captured automatically.

The architecture of the system 10 allows for on-demand building of screen captures that share the same source as an application. The problem of having different screen captures in end user documentation than in an actual user interface may be eliminated. This is because the screens can be "captured" during the same build during software development as the actual user interface. In this embodiment, automated testing tools, such as the Rational® Functional Tester, may be used to access the correct screen configurations, since these are only ever created dynamically at run-time. Rational® is a trademark or registered trademark of International Business Machines Corporation in the United States, other countries, or both. Alternatively, manually exercising the product with the screen capture tool 32 turned on would allow for either on-demand captures, or automated captures, as each material change to the user interface occurs.

The format for the SVG screen capture file 36, in this embodiment, may be XML-based, which allows for search and retrievability of the graphics (by screen title for example). Importantly, any text on the screen may have the same properties file 30 as the originating source. By knowing this canonical (trusted) source for the text on the screen 18, additional tools could be created which allow searches even before the first build—or mappings from the screen capture back to the originating properties file if editing of the text is desired. Screens that a programmer creates without using a properties file (hard coding English text for example) will quickly be discovered by the screen capture tool 32.

The properties file 30 is used to facilitate the generation of different versions of the software product being developed using the system 10. For example, it may be desired to be able to have different versions of the software product to sell in many different languages. Many software products need to be sold in over 100 different languages. The property file 30 is used to store a set of instructions so that the computer knows how to remember the windows and user interface widgets. The instructions are labeled with a variable that points to a property file. The property file 30 is stored with the different language versions of a piece of text. For example, the word "OK" in English will need to be translated into a different expression for different languages. In conventional systems, a different version of the software product must be manipulated to generate different screen captures for each language. In the system 10, the SVG rendering library 30 allows the user to just plug text in where it should be one time and the translated versions will flow up from the properties file 30 to where it should appear in the SVG rendering library 36.

In addition, the most common benefit of SVG, which is to render at any scale, can be gained with the present embodiment so that publishing to a wide variety of platforms (web, PDF, etc.) is possible.

Figure 2:
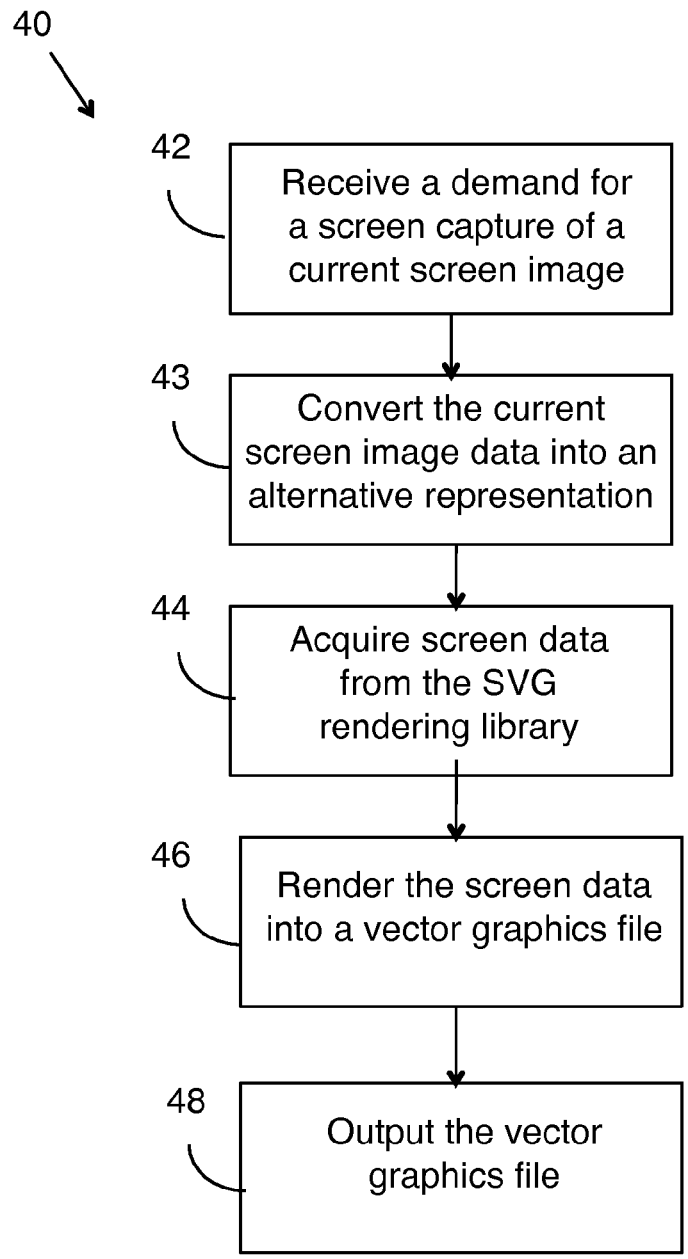
FIG. 2 shows a flowchart of a process for on-demand screen capture in accordance with an embodiment of the invention.

FIG. 2 shows a flowchart of a process 40 for on-demand screen capture in accordance with an embodiment of the invention. In block 42, a demand for a screen capture is received from a user or from a script-driven interaction. As mentioned above, the demand may come from various sources. The demand may come directly from a user. For example, this user may be a software developer running the system who observes a screen come up on their native operating system. Note that the native library 20 is still active. The user may then decide to capture the screen at that point. Conventionally, a screen capture tool may be used at this point to scrape those pixels off at that point and put them in a file.

In contrast, in the system 10 of embodiments of the invention, the system will determine where it is in the code and what is running at that point, what call would have been made. Instead of that call, the system 10 will make a call to the SVG rendering library 34 and then dump that representation of the way the screen would look in a generalized view into the SVG screen capture file 36. This is the way the SVG rendering library 34 gets called. Instead of writing a screen out to an operating system screen it writes the screen to an SVG file.

Alternatively, in block 42 instead of having the demand come manually from a user, it may come from a screen capture breakpoint, similar to a debugging breakpoint. Thus, at certain predetermined points the system will issue a command to take a screen capture at that point in the program. One advantage of this approach is that at any point in time the program can be re-run to re-capture the screen if there has been a change to the screen or to the order in which the screens appear. Those skilled in the art will appreciate that there may be still other sources or events that trigger the screen capture demand in block 42.

In block 43, the current screen data is converted into an alternative representation and stored in the SVG rendering library 34, where this alternative representation is one that is capable of being stored in a plurality of software platforms. In block 44, this is acquired from the SVG rendering library 34. This screen data is then rendered into a vector graphics file, such as a SVG file, in block 46. In block 48, the vector graphics file is output.

Figure 3:
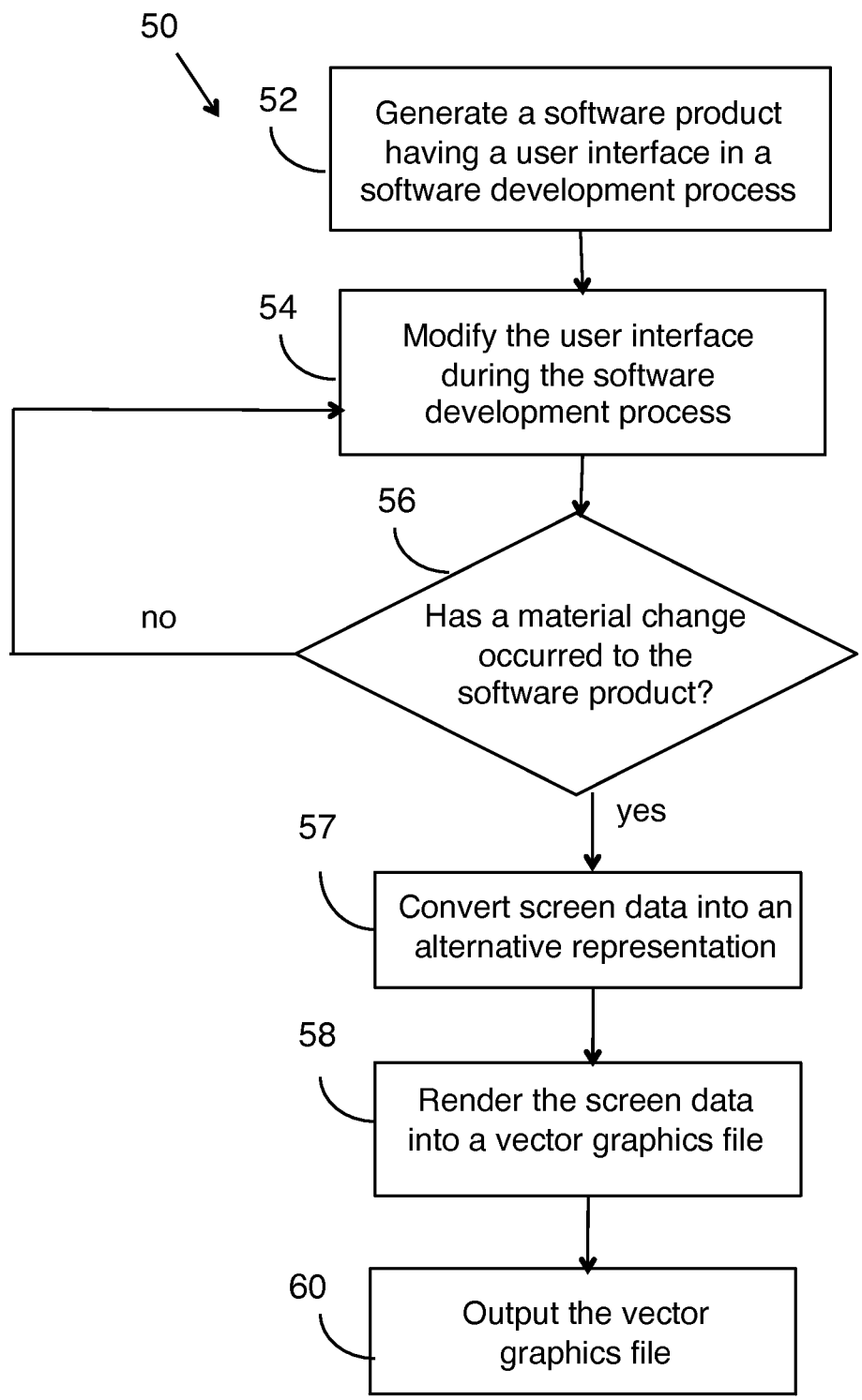
FIG. 3 shows a flowchart of a process for automatically generating a screen capture for end user documentation during software development in accordance with an embodiment of the invention.

FIG. 3 shows a flowchart of a process 50 for automatically generating a screen capture for end user documentation during software development in accordance with another embodiment of the invention. In block 52, the software product development process is initiated. Note that much of this may be done through the widget library 28 so that the programmer does not need to be concerned with the end operating system. This aspect is taken advantage of by the present invention, which and captures this coding and converts it into an SVG file that can be expressed in a plurality of operating systems. In block 54, a user interface of the software product is modified. A determination is then made of whether a material change to the software product has occurred, in block 56. In one embodiment, this is done in conjunction with the use of a user interface tester, such as the previously mentioned Rational® Functional Tester, or other similar testing products. In which case, steps 52-56 will be repeated and the screen is rendered after running through the program again.

If there has not been a change, as determined by block 56, the process 50 returns to block 54. If there has been a change as determined by block 56, the screen data is converted into an alternative representation that can be expressed in a plurality of operating systems. In block 58, the screen data is rendered into a vector graphics file using the alternative representation. The vector graphics file is then output, in block 60, for use in user documentation of the software product.

As can be seen from the above disclosure, embodiments of the invention provide a platform agnostic screen capture tool. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
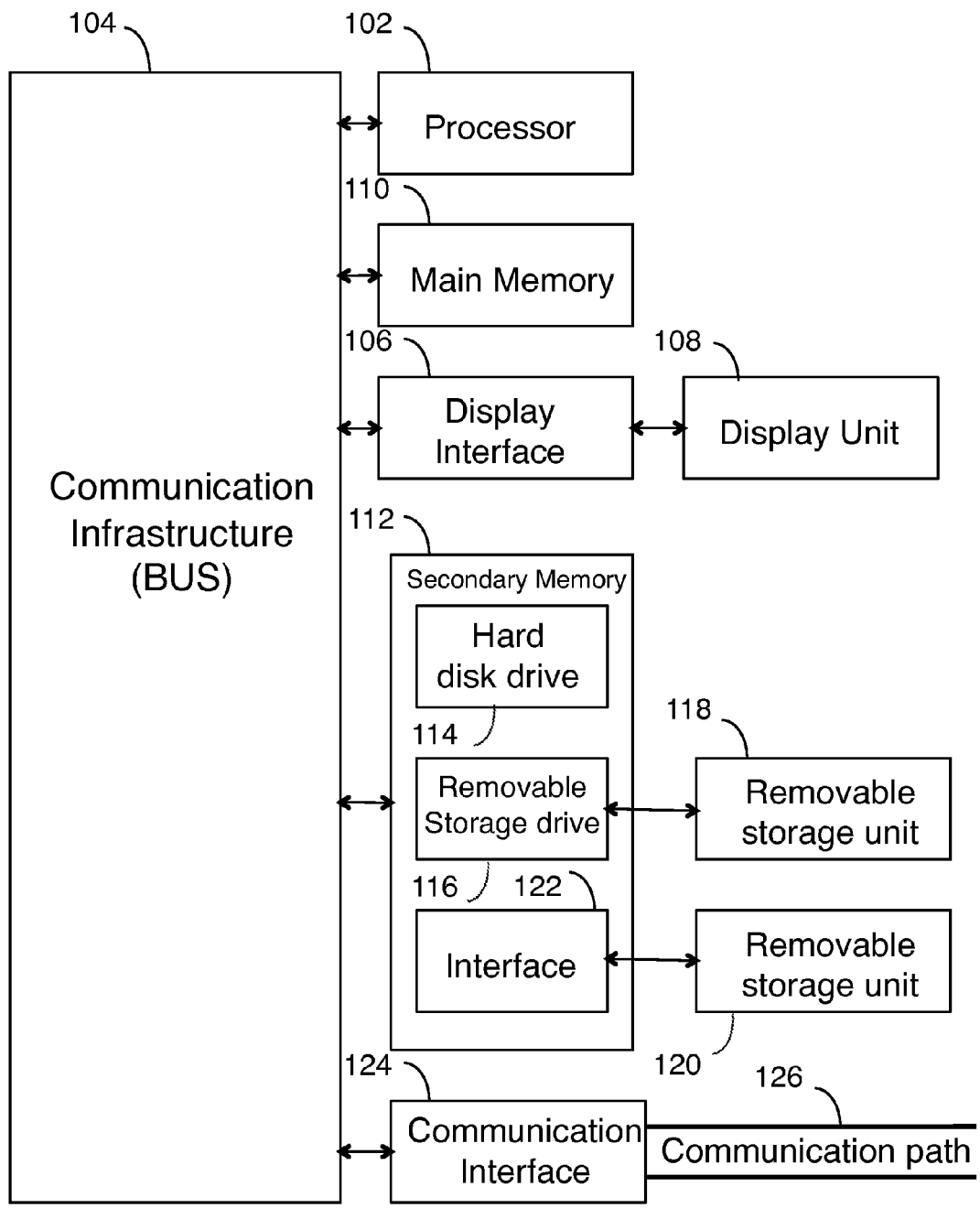
FIG. 4 shows a high level block diagram of an information processing system useful for implementing one embodiment of the present invention.

FIG. 4 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    one or more processors;
    a memory device containing code executable by the one or more processors, the code comprising:
        a program;
        a breakpoint component configured to set a screen breakpoint corresponding to a particular point during the execution of the program; and
        a screen data capture tool configured to, responsive to detecting the particular point during the execution of the program has been reached, generate a vector graphics screen capture file comprising a platform-agnostic depiction of a current screen output of the program, wherein an operating system of the system is configured to render a platform-specific depiction of the current screen output of the program, wherein the platform-agnostic depiction of the current screen output includes a platform-agnostic depiction of a first graphical element, and wherein the platform-specific depiction of the current screen output includes a platform-specific depiction of the first graphical element that is visually different from the platform-agnostic depiction of the first graphical element, comprising:
            instructing the operating system of the system to generate vector graphics data that depicts a generalized view of the current screen output of the program that is not specifically adapted to any particular operating system, by using a vector graphics library component instead of a native rendering library of the operating system; and
            saving the vector graphics data as the vector graphics screen capture file.

2. The system according to claim 1 wherein the computer system includes a native library, a Java Native Interface, a standard widget toolkit, and a properties file.

3. The system according to claim 2 wherein the vector graphics screen capture file has a separate layer for widgets.

4. The system according to claim 2 wherein the vector graphics screen capture file is a scalable vector graphics file.

5. A system comprising:
    one or more processors;
    a memory device containing code executable by the one or more processors, the code comprising:
        a program;
        a breakpoint component configured to set a screen breakpoint corresponding to a particular point during the execution of the program; and
        a screen data capture tool configured to, responsive to detecting the particular point during the execution of the program has been reached, generate a vector graphics screen capture file comprising a platform-agnostic depiction of a current screen output of the program, wherein an operating system of the system is configured to render a platform-specific depiction of the current screen output of the program, wherein the platform-agnostic depiction of the current screen output includes a platform-agnostic depiction of a first graphical element, and wherein the platform-specific depiction of the current screen output includes a platform-specific depiction of the first graphical element that is visually different from the platform-agnostic depiction of the first graphical element, comprising:
            instructing the operating system of the system to generate vector graphics data that depicts a generalized view of the current screen output of the program that is not specifically adapted to any particular operating system, by using a vector graphics library component instead of a native rendering library of the operating system; and
            saving the vector graphics data as the vector graphics screen capture file; and
    generate an end user documentation containing published versions of the vector graphics screen capture file for a plurality of different operating systems.

6. The system according to claim 5 wherein the vector graphics screen capture file is a scalable vector graphics file.

7. A computer program product for performing screen capture, the computer program product comprising:
    a computer-usable memory having computer-usable program code embodied therewith, the computer-usable program code configured to:
        set a screen breakpoint corresponding to a particular point during the execution of a program;
        responsive to detecting the particular point during the execution of the program has been reached, generate a vector graphics screen capture file comprising a platform-agnostic depiction of a current screen output of the program, wherein an operating system of the system is configured to render a platform-specific depiction of the current screen output of the program, wherein the platform-agnostic depiction of the current screen output includes a platform-agnostic depiction of a first graphical element, and wherein the platform-specific depiction of the current screen output includes a platform-specific depiction of the first graphical element that is visually different from the platform-agnostic depiction of the first graphical element comprising:

instructing the operating system of the system to generate vector graphics data that depicts a generalized view of the current screen output of the program that is not specifically adapted to any particular operating system, by using a vector graphics library component instead of a native rendering library of the operating system; and saving the vector graphics data as the vector graphics screen capture file.

* * * * *